(12) United States Patent
Mallary et al.

(10) Patent No.: US 8,077,417 B2
(45) Date of Patent: Dec. 13, 2011

(54) SKIP BLOCK WRITING FOR BIT PATTERNED MEDIA WRITE SYNCHRONIZATION

(75) Inventors: Michael Leigh Mallary, Harmony, PA (US); Walter Richard Eppler, Cranberry Township, PA (US); Werner Scholz, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 177 days.

(21) Appl. No.: 12/332,441

(22) Filed: Dec. 11, 2008

(65) Prior Publication Data

US 2010/0149675 A1   Jun. 17, 2010

(51) Int. Cl.
*G11B 5/09*   (2006.01)
(52) U.S. Cl. ..................... 360/51; G9B/5.033
(58) Field of Classification Search .......... None
See application file for complete search history.

(56) References Cited

U.S. PATENT DOCUMENTS

| | | | |
|---|---|---|---|
| 4,807,211 A * | 2/1989 | Getreuer | 369/44.13 |
| 6,084,739 A | 7/2000 | Assouad | |
| 6,222,692 B1 | 4/2001 | Shrinkle | |
| 6,643,082 B1 | 11/2003 | Belser | |
| 6,738,205 B1 | 5/2004 | Moran et al. | |
| 6,738,207 B1 | 5/2004 | Belser et al. | |
| 6,754,017 B2 | 6/2004 | Rettner et al. | |
| 6,950,259 B2 | 9/2005 | Osafune | |
| 7,035,029 B2 * | 4/2006 | Sawada et al. | 360/51 |
| 7,088,534 B2 | 8/2006 | Sutardja | |
| 7,133,229 B2 | 11/2006 | Semba | |
| 7,149,055 B2 * | 12/2006 | Clinton et al. | 360/125.3 |
| 7,212,367 B2 | 5/2007 | Clinton et al. | |
| 7,324,294 B2 | 1/2008 | Moser | |
| 7,440,213 B2 * | 10/2008 | Amin et al. | 360/66 |
| 7,643,235 B2 * | 1/2010 | Erden et al. | 360/51 |
| 2005/0094301 A1 | 5/2005 | Berman et al. | |

* cited by examiner

*Primary Examiner* — Daniell L Negron
(74) *Attorney, Agent, or Firm* — Robert P. Lenart, Esq.; Pietragallo Gordon Alfano Bosick & Raspanti, LLP

(57) ABSTRACT

A method for synchronizing writing to a bit patterned media includes: reading bits from skipped blocks on the bit patterned media, using timing of bits read from the skipped blocks to update a write clock, and writing request data to physical blocks on the bit patterned media, interleaved with the skipped blocks. An apparatus that operates in accordance with the method is also provided.

20 Claims, 5 Drawing Sheets

| READ BLOCK N−2 | READ BLOCK N−1 | WRITE BLOCK N | READ BLOCK N+1 | WRITE BLOCK N+2 | READ BLOCK N+3 | READ BLOCK N+4 |
|---|---|---|---|---|---|---|

| READ BLOCK N−2 | READ BLOCK N−1 | WRITE BLOCK N | READ BLOCK N+1 | WRITE BLOCK N+2 | READ BLOCK N+3 | READ BLOCK N+4 |

*FIG. 3*

| READ 2ND HALF OF BLOCK N−1 | READ 1ST HALF OF BLOCK N (a) | READ 2ND HALF OF BLOCK N (b) | READ 1ST HALF OF BLOCK N+1 (c) | READ 2ND HALF OF BLOCK N+1 (d) | WRITE 1ST HALF OF BLOCK N+2 (e) | READ 2ND HALF OF BLOCK N+2 (f) | WRITE 1ST HALF OF BLOCK N+3 (g) | READ 2ND HALF OF BLOCK N+3 (h) | READ 1ST HALF OF BLOCK N+4 (i) |

*FIG. 4*

SKIP BLOCK WRITING FOR BIT PATTERNED MEDIA WRITE SYNCHRONIZATION

BACKGROUND

This invention relates generally to magnetic data storage devices that include patterned media, wherein each data bit is stored in a magnetically isolated block on the media, and more particularly to such devices with improved write clock synchronization.

Magnetic recording hard disc drives with bit patterned magnetic recording media have been proposed to increase the data density. In bit patterned media, the magnetic material on the disc is patterned into small isolated blocks or islands such that there is a single magnetic domain in each island or "bit". The single magnetic domains can be a single grain or a few strongly coupled grains that switch magnetic states in concert as a single magnetic volume. To produce the required magnetic isolation of the patterned blocks, the regions between the blocks are essentially nonmagnetic. Bit patterned media can solve the thermal decay problem that is expected to limit perpendicular recording products to less than 1 $Tb/in^2$.

Disc drives typically use an actuator for positioning the read/write heads adjacent to the storage media. A servo control system receives servo positioning information read by the read/write heads from the data tracks, typically from equally-angularly-spaced servo sectors that extend generally radially across the tracks. The servo control system supplies control signals to the actuator to maintain the read/write heads on track and move them to the desired tracks for reading and writing of data. The servo sectors also contain servo timing marks (STMs) that indicate the start of the servo sectors. The STMs are often used as a reference clock signal for a write clock which controls the timing of the write pulses from the disc drive write head.

To assure that the disc drive write head magnetizes the islands on bit patterned media, the islands on the media must be positioned with an accurate period, and the write clock must be synchronized with the passing of the islands beneath the write head. Write clock synchronization ensures that a magnetic write field supplied by a transducer in the recording head will occur when the transducer is adjacent to one of the islands.

In storage systems that use bit patterned media, it is difficult to maintain adequate synchronization of the write clock with the bits on the media. While an error correcting code is typically used to correct corrupted bits, failure of write clock synchronization with the bits on the media may corrupt more bits than the error correcting code firmware can correct.

SUMMARY

In one aspect, the invention provides a method for synchronizing writing to a bit patterned media including: reading bits from skipped blocks on the bit patterned media, using timing of bits read from the skipped blocks to update a write clock, and writing request data to physical blocks on the bit patterned media, interleaved with the skipped blocks.

In another aspect, the invention provides an apparatus including a bit patterned storage media, a recording head for reading bits from the storage media and writing data to the storage media, wherein the recording head reads bits from skipped blocks on the storage media, and a controller including a write clock, wherein timing of the bits read from the skipped blocks is used to update a write clock, and the recording head writes request data to physical blocks on the storage media, interleaved with the skipped blocks.

BRIEF DESCRIPTION OF THE DRAWINGS

FIG. 3 is a schematic representation of a scheme for reading from and writing to a bit patterned storage media.

FIG. 4 is a schematic representation of another scheme for reading from and writing to a bit patterned storage media.

DETAILED DESCRIPTION OF THE INVENTION

Figure 1:
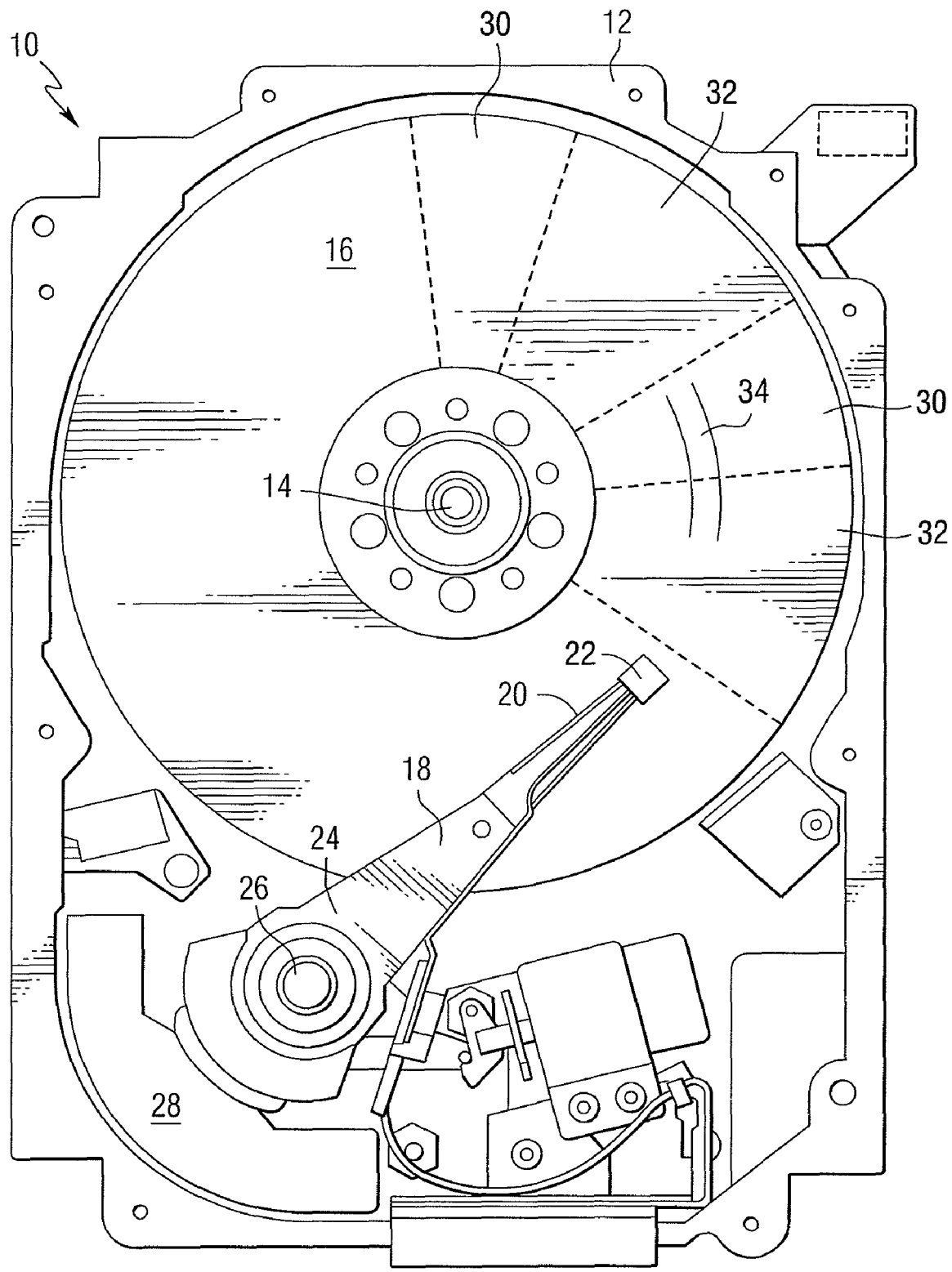
FIG. 1 is a schematic representation of a data storage device constructed in accordance with an aspect of the invention.

Referring to the drawings, FIG. 1 is a pictorial representation of the mechanical portion of a disc drive 10 that can be constructed in accordance with an aspect of the invention. The disc drive includes a housing 12 (with the upper portion removed and the lower portion visible in this view) sized and configured to contain the various components of the disc drive. The disc drive includes a spindle motor 14 for rotating at least one data storage media 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor, which may be a voice coil motor 28, is located at the arm's second end 24, for pivoting the arm 18 to position the head 22 to a desired position. The actuator motor 28 is controlled by a controller that is not shown in this view. The disc includes a plurality of servo sectors 30 arranged between a plurality of data sectors 32. The data and servo information is contained in a plurality of tracks 34.

In typical disc drives, data is stored in blocks on that storage media. A block represents a physical sector on the surface of a disc. It is the minimal physical division of data in a disc drive. Nearly all modern disc drives use a constant block size of 512 bytes.

Where the storage media is a bit patterned media (BPM), the media comprises a plurality of bit islands that can be magnetized to store single bits and these bit islands are separated by non-magnetic material called "trenches".

Figure 2:
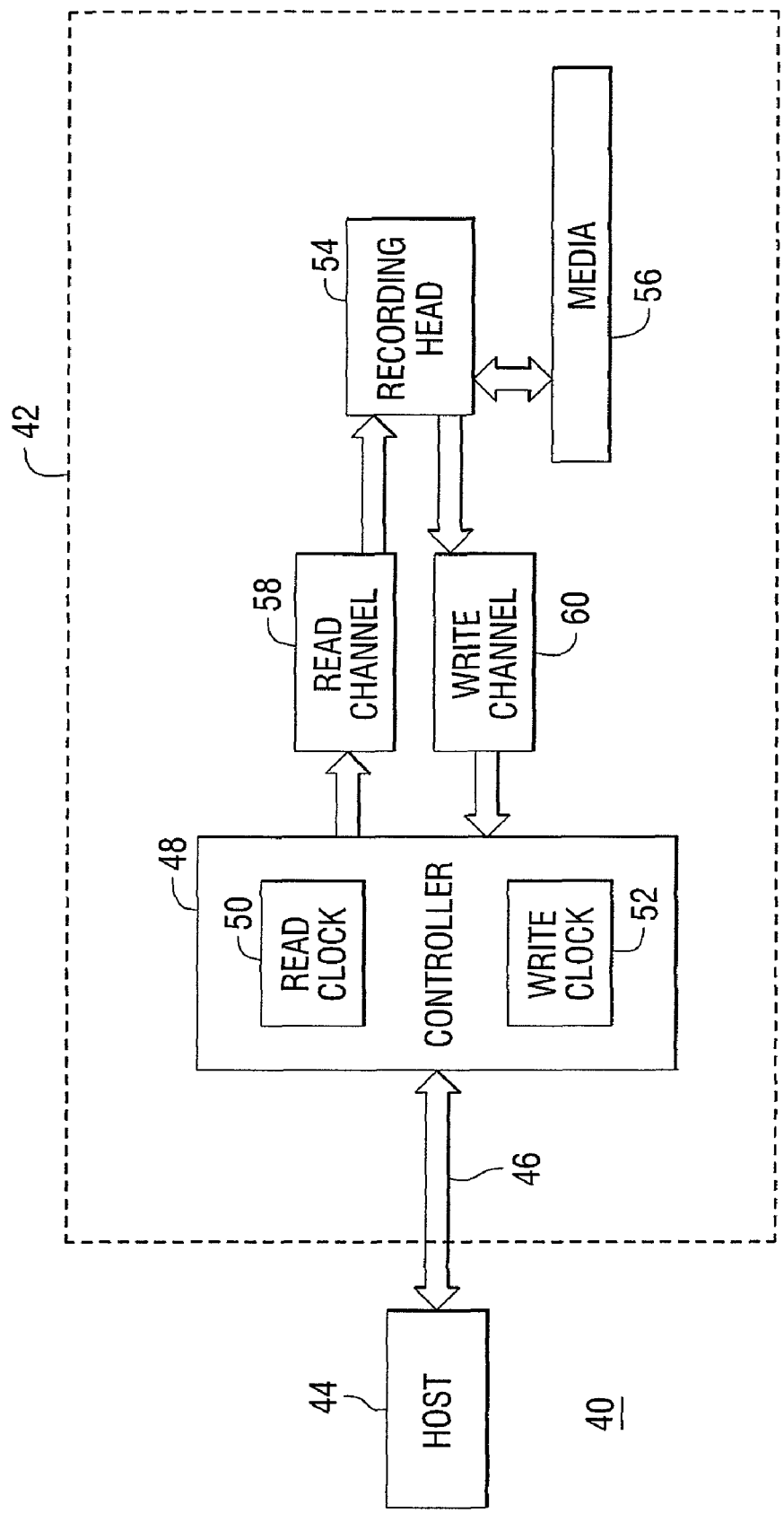
FIG. 2 is a block diagram of a system including portions of a data storage device that may be used to implement one aspect of the invention.

FIG. 2 is a block diagram of a system 40 showing relevant portions of a data storage device 42 that may be used to implement one aspect of the invention. In the example of FIG. 2, the data storage device exchanges information with a host system 44 via a bus 46. The data storage device includes a controller 48 that controls the operation of the data storage device.

The controller includes a read clock 50 and a write clock 52. A recording head 54 is positioned adjacent to a bit patterned storage media 56, for reading data from and writing data to the media. To read data, the recording head produces signals that are processed in a read channel 58 to recover the read bits. The read clock controls parsing of the data stream into bits, each with a readback amplitude that is digitized. To write data, the recording head produces a magnetic field in response to signals received from a write channel 60 to set the orientation of the magnetization of the islands on the media. The write clock controls the timing of the write operation in the recording head. To ensure that the data is written to the intended islands, it is important for the write clock to be synchronized with the passages of the islands under a write pole in the recording head.

When a storage device such as that shown in FIG. 1 uses a bit patterned media, there must be a mechanism for accurately synchronizing the write clock to the bit pattern. Ideally one would read the data immediately after writing it. This would allow the detection of synchronization error but it involves overcoming many practical difficulties.

For a conventional BPM approach with one row of bits per track, synchronization based on the servo spokes might be adequate with a disc locked clock. However some BPM systems, such as those using a staggered bit architecture, have more stringent timing requirements (e.g., 30 ps, 1 sigma). For these systems, synchronization based on the servo spokes with a disc locked clock may be insufficient to meet the stringent timing criteria.

Synchronization of the write clock for writing a single block can be improved by reading the preceding block. In some cases, for long writes, synchronization can be maintained by writing only every other block. In other cases, for example, for the tight synchronization tolerance of staggered bit media, the blocks can be divided into fragments, and every other fragment can be written. These strategies are referred to as Skip Block Writing (SBW).

Bits in the skipped blocks, or fragments, can be read and used to synchronize the write clock for writing to the next adjacent block, or fragment. The read clock is synchronized to the data, for example using electronics known as a phase locked loop, which senses whether the transitions are ahead of or retarded from the read clock. It then adjusts the frequency and phase of the read clock accordingly. Thus the read and write clock frequencies are locked to the disc rotation angular frequency, and the phase is locked to the bits read from the skipped blocks.

By writing only every other physical block (PB), or fragment of a physical block, with a string of Logical Blocks (LBs), n, n+1, n+2, . . . , one can read the skipped blocks, or fragments, to update the synchronization of the write clock.

For example, when a host system requests a write of data that would extend over many physical blocks, the data storage system would read bits from a string of blocks on the disc immediately before the first write to set the write clock and then write block N, read N+1, write N+2, read N+3, etc.

FIG. 3 is a schematic representation of a scheme for reading from, and writing to, a bit patterned storage media. A track on the media is divided into N physical blocks. In this example, data is read from physical blocks N−2, N−1, N+1, N+3 and N+4, and written to physical blocks N and N+2. In other words, logical blocks n and n+1 are written to physical blocks N and N+2.

Data read from block N−1 is used to synchronize the writer clock, such that data written to block N is synchronized with the passage of bit islands under the write pole. Data read from block N+1 is used to synchronize the writer clock, such that data written to block N+2 is synchronized with the passage of bit islands under the write pole. In effect, block N+1 is a skipped block. That is, data is not written to block N+1. The timing of the read data is used to synchronize the write clock. The bits read from the skipped blocks can be, for example, previously written user data, synchronization data, or other bits that are located in the data sectors of the disc. The binary values of the data previously stored reading the skipped blocks are not important.

With the data read from skipped blocks, the system can maintain synchrony of the write clock and predict if any of the writes were mis-phased enough to risk written-in errors. If such a condition is detected, then the suspect data can be kept in the write buffer until an idle time read can be done or an immediate read after write or re-write can be executed on the next revolution. For example, excessive mis-phasing of the write clock with the skipped block N+3 would indicate potential errors in the written block N+2.

If the amount of write clock drift over the length of a physical block is sufficient to cause errors, then one can fragment the physical blocks into smaller physical blocks (SPBs). FIG. 4 is a schematic representation of a scheme for reading from, and writing to, a bit patterned storage media. In the example of FIG. 4, physical blocks are divided into halves. A first half of each block is read to recover timing information and to synchronize the write clock for writing data to the second half of each block. Alternately, reading the last half of physical block N can be used to set the write clock to write the first half of physical block N+1.

In the example of FIG. 4, one would skip block write the SPBs and thus get more frequent timing diagnostics and corrections. However, this scheme would involve more overhead for SPB headers. With all skip block writing schemes, the long request transfer rate is reduced by 50%. Nevertheless, this decrease in transfer rate may be justified in order to guarantee data integrity. For short requests, the performance will be dominated by seek-settle time as is presently the case in disc drives.

FIG. 4 shows a skip block scheme where each physical block is split into two SPBs, and the data are written in the sequence "1a 1c 2e 2g 3i 3k 4m 4o . . . ", where the numbers indicate the logical block number, the letters indicate the SPB, and the spaces indicate the boundaries of the physical blocks.

This approach can be extended to other schemes, where the blocks are split up into even more SPBs. This would make the SPBs even shorter and allow for even more frequent updates of the write synchronization. For example, the requests can be written as "1a 1c 1e 2g 2i 2k 3m 3o 3q . . . ". Each of these schemes leads to a penalty in the long request transfer rate. In addition, there is an additional overhead caused by padding between the individual SPBs, which is required to give the write head enough time to relax to its zero field remanent state and avoid overwriting the following SPB.

Figure 5:
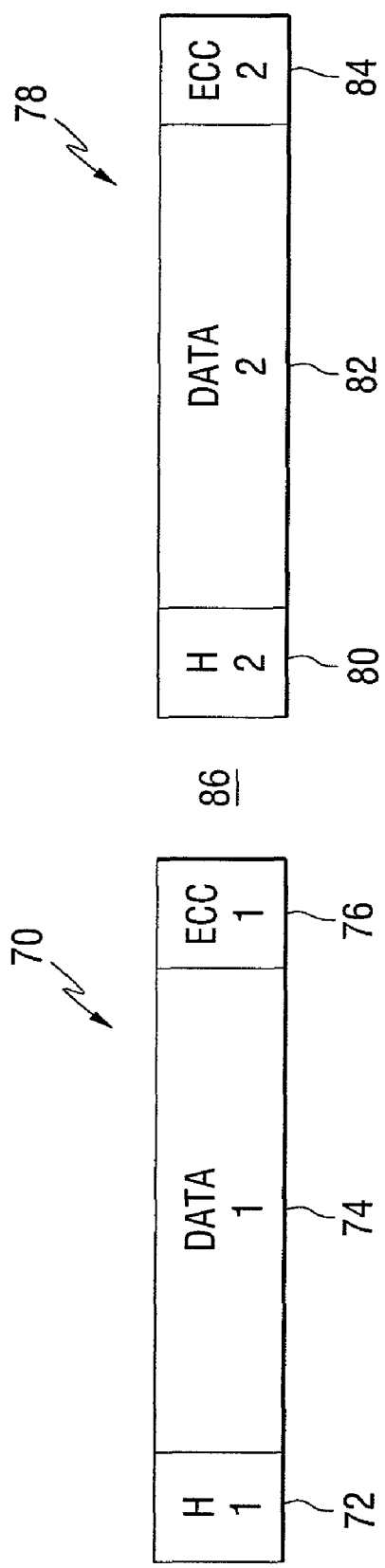
FIG. 5 is a schematic representation of request information as written on a storage media.

For the following description, a data sequence to be written or read is referred to as a request. FIG. 5 is a schematic representation of request information as written in whole physical blocks on a storage media. A first request is written in block 70, and includes a header 72, data 74 and an error correction code 76. A second request is written in block 78, and includes a header 80, data 82 and an error correction code 84. A space 86 is provided between the blocks. The space provides a time during which the magnetic write head can be demagnetized.

Figure 6:
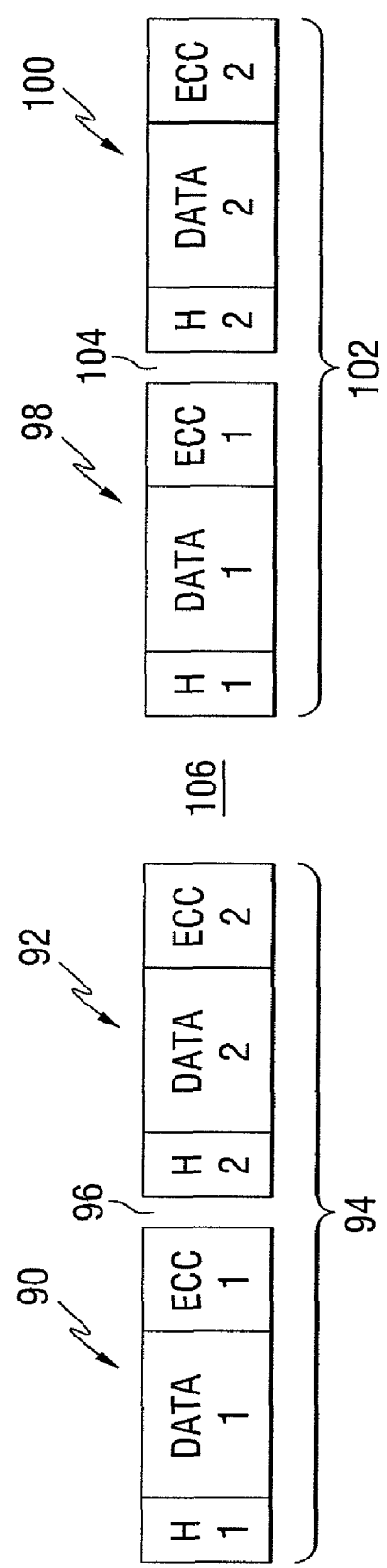
FIG. 6 is another schematic representation of request information as written on a storage media.

FIG. 6 is a schematic representation of request information as written in smaller physical blocks on a storage media. A first portion of a first request is written in SPB 90, and includes a header, data and an error correction code (ECC). A first portion of a second request is written in SPB 92, and includes a header, data and an error correction code. SPBs 90 and 92 can comprise a single 512-byte physical block 94. A space 96 is provided between the SPBs. The space provides a time during which the magnetic write head can be demagnetized.

A second portion of a first request is written in SPB 98, and includes a header, data and an error correction code. A first portion of a second request is written in SPB 100, and includes a header, data and an error correction code. SPBs 98 and 100 can comprise a single 512-byte physical block 102. A space 104 is provided between the SPBs. An additional space 106 is provided between blocks 94 and 102. The spaces provide a time during which the magnetic write head can be demagnetized.

The headers and ECC represent padding that takes up some real estate on the disc surface and reduces the effective user data density on the disc. This problem can be addressed by using a recording head design, which can very quickly reduce the write field. Such a head can be a wire assisted magnetic recording (WAMR) head.

Figure 7:
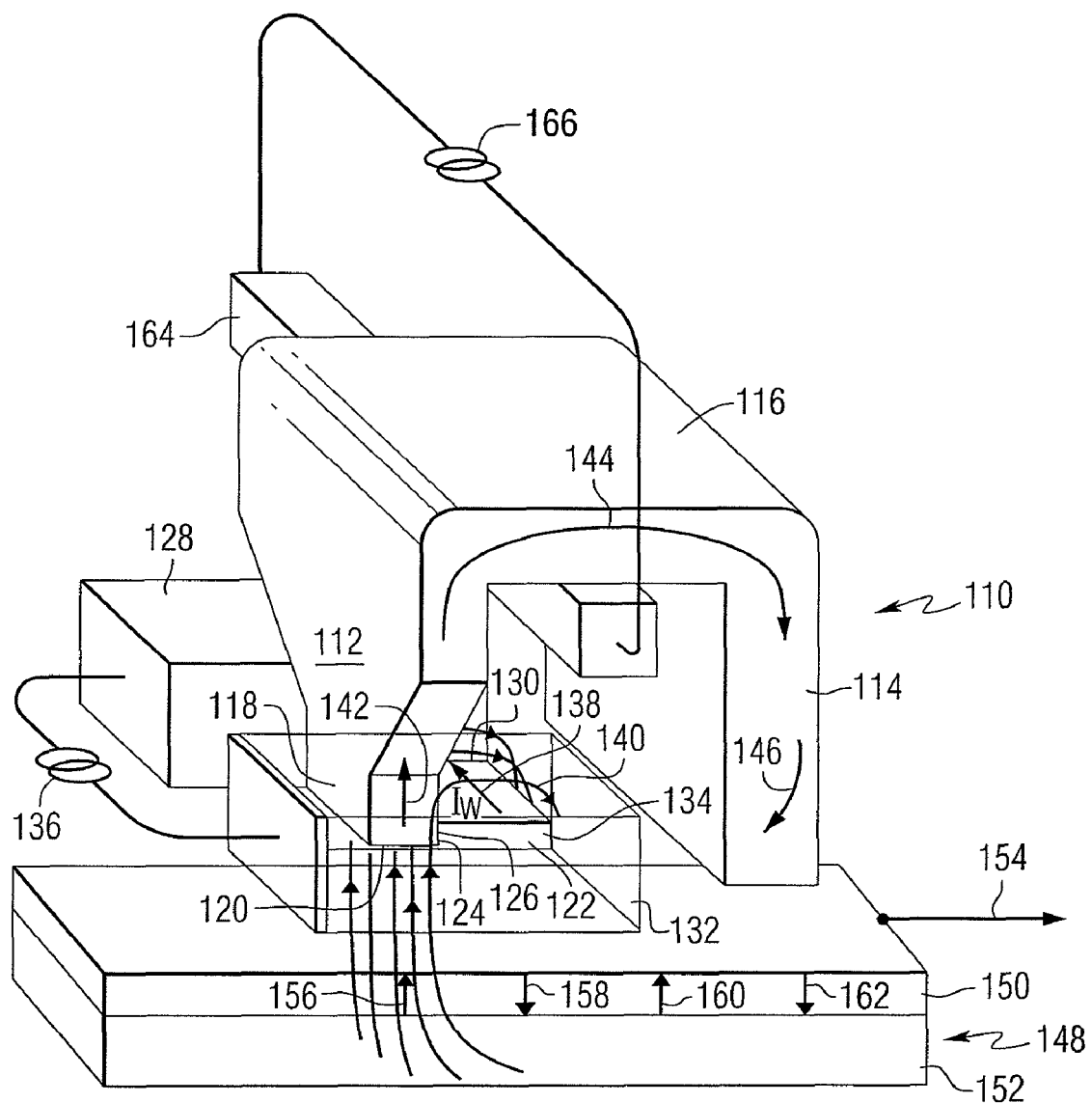
FIG. 7 is a schematic representation of a recording head that may be used to implement an aspect of the invention.

FIG. 7 is a pictorial representation of a WAMR recording head 110, which can be used to provide a quick reduction in the write field. The recording head includes a write pole 112 and a return pole 114 magnetically coupled by a yoke 116. A tip 118 of the write pole is positioned adjacent to an air bearing surface (ABS) 120 of the recording head. A coil 164 is used to magnetically energize the write pole to provide a write field. The coil can be wound around the yoke (with one or more turns) and includes at least one conductor passing between the write pole and the return pole. The coil 164 can be excited with a current from a first current source 166.

An ampere wire in the form of a conductor 122, has a rectangular cross-section and is positioned along the air bearing surface and between the write pole and the return pole. An edge 124 of the conductor 122 is positioned adjacent to an edge 126 of the write pole. A first electrical contact/heat sink 128 is electrically connected to a first end 130 of the conductor. A second electrical contact/heat sink 132 is electrically connected to a second end 134 of the conductor. The electrical contact/heat sinks are coupled to a second source 136. When writing data to a storage media, current from the second current source flows through the electrical contact/heat sinks and the conductor in a direction illustrated by arrow 138. This current creates a magnetic field around the conductor as illustrated by arrow 140. The magnetic field augments the magnetic field of the write pole, inducing magnetic flux through the yoke and the return pole as illustrated by arrows 142, 144 and 146.

In operation, the air bearing surface of the recording head is positioned adjacent to a storage media 148, which includes a magnetically hard recording layer 150 and a magnetically soft underlayer 152. As the storage media moves as illustrated by arrow 154, the direction of magnetization of magnetic domains 156, 158, 160 and 162 in the recording layer is affected by the magnetic field in the vicinity of the write pole tip.

In the recording head of FIG. 7, the ampere wire conductor is integrated with a "single-pole" writer at the ABS, such that one edge of the wire is near the inside edge of the single pole (or write pole), which is the writing (or trailing) edge. Thus, the wire is inside the gap formed between the write pole and the return pole.

An additional description of a WAMR recording head can be found in U.S. Pat. No. 7,212,367, which is hereby incorporated by reference. Usually, the WAMR wire is used to enhance the write field by way of the current flowing in the ampere wire and by driving the write pole hard into saturation. On the other hand, in a WAMR head with an independently driven WAMR wire, the current through the wire can be switched to its opposite polarity such that the field of the current through the wire opposes the field of the write pole and also demagnetizes the write pole. This reversal of the ampere wire current can be used to cancel the field of the write pole with the field of the WAMR wire, thus setting the total field of the writer to zero. Due to the proximity of the WAMR wire to the write pole and the air bearing surface, this field cancellation method is significantly faster than conventional methods, which just lets the write pole relax to its remanent state or actively assist this mechanism with ac currents through the writer coil 164.

As a result, the active cancellation of the writer field with the WAMR wire could significantly reduce the amount of padding required between the SPBs and therefore increase the real estate efficiency of the skip block write method.

An additional aspect of the invention addresses the fact that the optimum phase relationship between the read clock and the write clock must be known before a skip block write operation is executed. Write synchronization calibration can be used to determine this relationship. The dependence of the media switching field on temperature, combined with the lack of infinite write field gradient, means that this optimal phase will be temperature dependent. The dependence of the write field on off-track position and fly height creates more dependencies for the optimal phase. All of these dependencies can be calibrated in the factory and the parameters stored in a table and used to set the optimal write-to-read clock phase based on in drive measurements of these parameters. In an alternate embodiment of this invention, dummy writes and reads may be periodically executed during idle time in order to verify the accuracy of these parameters and to modify their values if needed.

While the invention has been described in terms of several examples, it will be apparent to those skilled in the art that various changes can be made to the disclosed examples, without departing from the scope of the invention as set forth in the following claims. The implementations described above and other implementations are within the scope of the following claims.

What is claimed is:

1. A method for synchronizing writing to a bit patterned media, the method comprising:
    reading previously written user data bits from skipped physical blocks in data sectors on the bit patterned media;
    using timing of the previously written user data bits read from the skipped blocks to update a write clock; and
    writing request data to other physical blocks on the bit patterned media, interleaved with the skipped blocks.

2. The method of claim 1, wherein the skipped physical blocks include 512 bytes.

3. The method of claim 1, wherein the skipped physical blocks include less than 512 bytes.

4. The method of claim 1, further comprising:
    predicting mis-phased writes; and
    storing suspect data in a write buffer.

5. The method of claim 1, further comprising:
    reversing a current in an ampere wire in a write head to actively cancel a write field after writing a last bit in at least one of the other physical blocks.

6. The method of claim 1, wherein the skipped physical blocks include more than 512 bytes.

7. The method of claim 1, wherein the write clock frequency is locked to a rotation angular frequency of the media, and the write clock phase is locked to the read bits.

8. The method of claim 1, further comprising:
   measuring write clock drift over one of the other physical blocks, and fragmenting the other physical blocks if the write clock drift is sufficient to cause errors.

9. The method of claim 1, wherein the step of using timing of previously written user data bits read from the skipped blocks to update a write clock comprises:
   setting a write-to-read clock phase based on parameters stored in a table.

10. The method of claim 9, wherein the parameters include at least one of temperature, off-track position and fly height.

11. The method of claim 1, wherein the bit patterned storage media has a staggered bit architecture.

12. An apparatus comprising:
   a bit patterned storage media;
   a recording head for reading bits from the storage media and writing data to the storage media, wherein the recording head reads previously written user data bits from skipped physical blocks in data sectors on the storage media; and
   a controller including a write clock, wherein timing of the previously written user data bits read from the skipped physical blocks is used to update a write clock, and the recording head writes request data to other physical blocks on the storage media, interleaved with the skipped physical blocks.

13. The apparatus of claim 12, wherein the skipped physical blocks include 512 bytes.

14. The apparatus of claim 12, wherein the skipped physical blocks include less than 512 bytes.

15. The apparatus of claim 12, wherein the controller predicts mis-phased writes and stores suspect data in a write buffer.

16. The apparatus of claim 12, wherein the controller reverses a current in an ampere wire in a write head to actively cancel a write field after writing a last bit in at least one of the other physical blocks.

17. The apparatus of claim 12, wherein the skipped physical blocks include more than 512 bytes.

18. The apparatus of claim 12, wherein the write clock frequency is locked to a rotation angular frequency of the storage media, and the write clock phase is locked to the read previously written user data bits.

19. The apparatus of claim 12, wherein the bit patterned storage media has a staggered bit architecture.

20. An apparatus comprising:
   a bit patterned storage media;
   a recording head for reading bits from the storage media and writing data to the storage media, wherein the recording head reads previously written user data bits from skipped physical blocks in data sectors on the storage media; and
   a controller including a write clock, wherein timing of the previously written user data bits read from the skipped physical blocks is used to update a write clock, and the recording head writes request data to other physical blocks on the storage media, interleaved with the skipped physical blocks, wherein the controller reverses a current in an ampere wire adjacent to a write pole in a write head to actively cancel a write field after writing a last bit in at least one of the other physical blocks.

* * * * *